United States Patent [19]
Langenbrunner et al.

[11] Patent Number: 5,275,529
[45] Date of Patent: Jan. 4, 1994

[54] SANDWICH PANEL JOINT

[75] Inventors: Leslie L. Langenbrunner, Cincinnati, Ohio; John W. Gurrad, Albuquerque, N. Mex.

[73] Assignee: General Electric Company, Cincinnati, Ohio

[21] Appl. No.: 853,228

[22] Filed: Mar. 16, 1992

[51] Int. Cl.$^5$ ............................................. F04D 29/66
[52] U.S. Cl. ..................................... 415/119; 244/132; 403/224; 403/388; 403/405.1; 403/408.1
[58] Field of Search ................. 415/9, 119; 403/405.1, 403/408.1, 224, 388; 244/132

[56] References Cited

U.S. PATENT DOCUMENTS

| | | | |
|---|---|---|---|
| 2,118,561 | 5/1938 | Kleeberg | 85/37 |
| 2,945,653 | 7/1960 | Atkin | 244/132 |
| 3,434,262 | 3/1969 | Lawrence | 52/617 |
| 4,244,661 | 1/1981 | Dervy | 403/388 |
| 4,452,335 | 6/1984 | Mathews et al. | 415/119 |
| 4,732,532 | 3/1988 | Schwaller et al. | 415/119 |
| 4,787,793 | 11/1988 | Harris | 403/408.1 |
| 4,949,450 | 8/1990 | Scharres | 403/408.1 |
| 5,129,447 | 7/1992 | Hamner | 403/408.1 |

FOREIGN PATENT DOCUMENTS

| | | | |
|---|---|---|---|
| 2459608 | 8/1975 | Fed. Rep. of Germany | 403/408.1 |
| 2853172 | 6/1979 | Fed. Rep. of Germany | 403/388 |
| 283052 | 10/1990 | Fed. Rep. of Germany | 403/408.1 |
| 0003130 | 8/1984 | PCT Int'l Appl. | 244/132 |
| 759250 | 10/1956 | United Kingdom | 403/408.1 |

OTHER PUBLICATIONS

The Shur-Lok Corporation, "Fasteners for Sandwich Structure," Copyright 1987, pages: Cover, intro., Table of Contents, 1-4, 7, 12, 15-18, 35, 36, 39, 43 and 44.

Primary Examiner—John T. Kwon
Attorney, Agent, or Firm—Jerome C. Squillaro

[57] ABSTRACT

A fastener extends through a bushing in a panel for joining the panel to a stationary frame. The bushing includes a tubular plug extending through the panel which includes a head, a shank, and a distal end. The bushing also includes a tubular sleeve extending into the panel and disposed around the plug shank, with an integral collar being fixedly bonded to a back surface of the panel. The panel is fixedly trapped between the collar and the plug head, and the plug distal end abuts the frame for predeterminedly spacing the collar from the frame.

13 Claims, 3 Drawing Sheets

SANDWICH PANEL JOINT

TECHNICAL FIELD

The present invention relates generally to sandwich panel joints, and, more specifically, to a joint securing an acoustic or flow panel in a gas turbine engine fan duct.

BACKGROUND ART

High-bypass turbofan gas turbine engines include a nacelle surrounding a fan and defining a fan duct through which flows fan air. The air is compressed by the fan and a portion thereof is discharged from the fan duct for providing thrust for powering an aircraft in flight.

In order to reduce noise emanating from the fan, the fan duct is typically lined with acoustic panels. The panels typically include a honeycomb core sandwiched between a back sheet and a face sheet. The panels are typically light-weight structures which are easily crushable and, therefore, metallic bushings are typically provided through apertures in the panels for preventing fasteners extending therethrough from crushing the panels when mounted to the nacelle.

In order to prevent undesirable vibration of the panels during operation of the engine, the bushings must be suitably secured to the panels. The bushings may be bonded to the panels, or molded therein, or mechanically joined thereto, for example, depending on the particular structure of the panel. In one prior art design, the acoustic panel includes fiberglass laminated back and face sheets over an aluminum or Nomex (Trademark—aramid fiber) honeycomb core. Aluminum bushings are used and are preferably tapered to form a frusto-conical member which is received in a complementary tapered, frusto-conical aperture through the panel. The bushing and panel aperture are tapered so that during assembly of the bushings to the panels, the conventional potting adhesive placed within the panel aperture is not excessively ejected from the aperture when the bushing is inserted therein. For comparison purposes, a cylindrical bushing inserted into a cylindrical aperture containing the potting adhesive will more fully push the adhesive from the aperture when the bushing is inserted therein. The tapered aperture and bushing allows more of the adhesive to remain between the aperture and the bushing to ensure an acceptable adhesive bond around the entire bushing in the aperture of the panel. Upon curing, the bushing is fixedly joined to the panel, and a conventional fastener fixedly joins the bushing against the nacelle for fixedly supporting the acoustic panels in the fan duct.

However, sandwich panels having graphite-epoxy laminated back and face sheets are known to effect galvanic corrosion with aluminum. Accordingly, the relatively inexpensive aluminum bushings may not be used unless suitable protection against galvanic corrosion is provided. Titanium bushings could be used instead of aluminum without galvanic corrosion, but the cost and weight thereof is substantial.

OBJECTS OF THE INVENTION

Accordingly, one object of the present invention is to provide a new and improved panel joint.

Another object of the present invention is to provide a panel joint having a bushing fixedly joined to the panel without crushing the panel.

Another object of the present invention is to provide a panel joint having a bushing compatible with graphite-epoxy laminated panels.

Another object of the present invention is to provide a panel joint having a bushing securely bonded by an adhesive to the panel.

DISCLOSURE OF INVENTION

A fastener extends through a bushing in a panel for joining the panel to a stationary frame. The bushing includes a tubular plug extending through the panel which includes a head, a shank, and a distal end. The bushing also includes a tubular sleeve extending into the panel and disposed around the plug shank, with an integral collar being fixedly bonded to a back surface of the panel. The panel is fixedly trapped between the collar and the plug head, and the plug distal end abuts the frame for predeterminedly spacing the collar from the frame.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
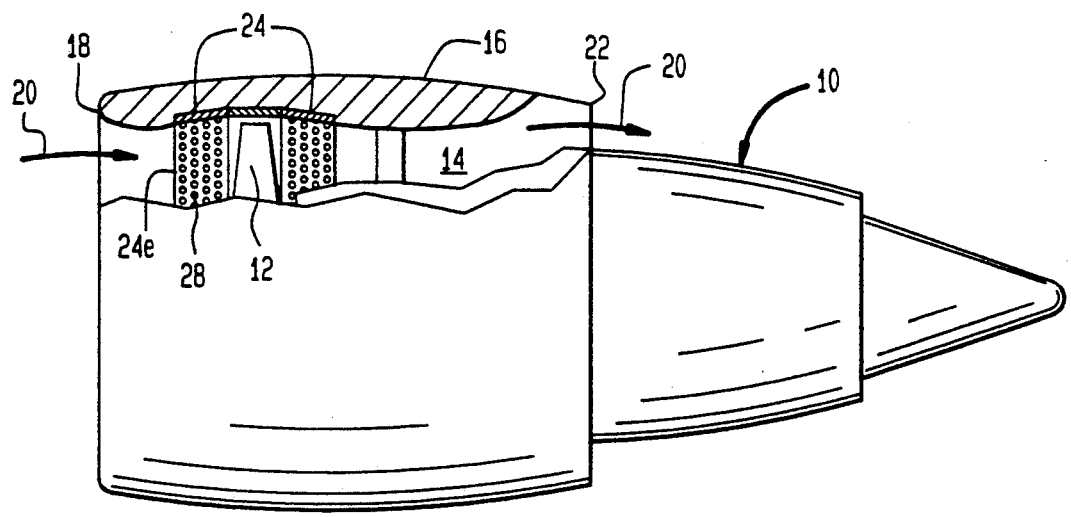
FIG. 1 is a schematic, partly sectional, side view of an exemplary gas turbine engine along its longitudinal centerline axis including an acoustic panel joined to the nacelle thereof in accordance with one embodiment of the present invention.

Illustrated in FIG. 1 is an exemplary high-bypass, turbofan gas turbine engine 10. The engine 10 includes a conventional fan 12 disposed within an annular fan duct 14 defined within an annular nacelle 16. The nacelle 16 includes an inlet 18 for receiving air 20, which air 20 is compressed by the fan 12 and discharged from an annular outlet 22 for providing thrust to power an aircraft (not shown) in flight. Since noise emanates from the fan 12 through the air 20 being channeled in the fan duct 14, annular acoustic panels 24 are fixedly joined to the nacelle 16 within the fan duct 14 for reducing noise.

Figure 2:
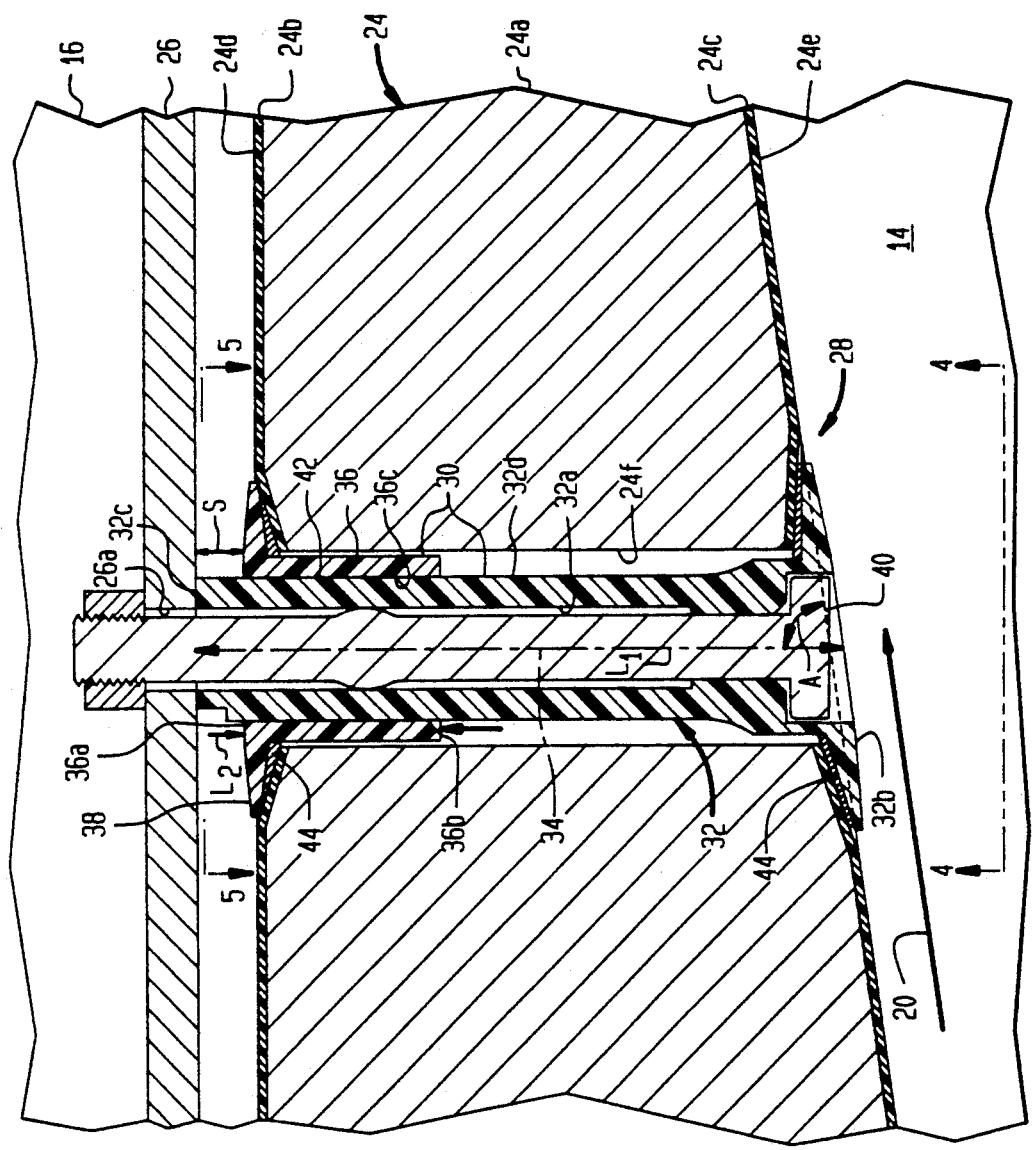
FIG. 2 is an enlarged longitudinal sectional view of one of the joints of the acoustic panel in the nacelle illustrated in FIG. 1.

Illustrated in FIG. 2 is an enlarged portion of one of the acoustic panels 24 which is disposed upstream of the fan 12. The nacelle 16 includes a conventional annular casing or frame 26 to which is fixedly joined the acoustic panel 24 by a plurality of axially and circumferentially spaced apart joints 28 in accordance with one embodiment of the present invention. The acoustic panel 24 is a conventional sandwich structural panel including a honeycomb core 24a conventionally sandwiched between a back sheet 24b and a face sheet 24c. The radially outer surface of the back sheet 24b defines a back surface 24d which faces the frame 26, and the radially inner surface of the face sheet 24c defines a face surface 24e which faces radially inwardly toward the fan 12 and forms a portion of the fan duct 14. The face sheet 24e may include a plurality of conventional apertures for reducing noise from the air 20.

The back and face surfaces 24d and 24e of the panel 24 are radially spaced apart, and an aperture 24f extends through the panel 24 from the back sheet 24b and through the face sheet 24c. Disposed through the panel aperture 24f and joined thereto is a two-part tubular bushing 30. The bushing 30 includes an elongate, tubular plug 32 extending through the panel aperture 24f. The plug 32 includes a central bore 32a, an enlarged head 32b abutting the panel face surface 24e, a distal end 32c extending outwardly from the panel back surface 24d and abutting the frame 26, and a shank 32d extending between the head 32b and the distal end 32c. The plug 32 has a length $L_1$ along a longitudinal axis 34 between the distal end 32c and the head 32b.

The bushing 30 also includes a tubular sleeve 36 extending into the panel aperture 24f, and disposed around and fixedly bonded to the plug shank 32d. An annular washer or collar 38 is formed integrally with a proximal end 36a of the sleeve 36 and is fixedly bonded to the panel back surface 24d for fixedly trapping the panel 24 between the collar 38 and the plug head 32b. Since the panel 24 is used in the fan duct 14, it is subject to vibratory excitation forces and, therefore, the panel 24 must be suitably secured or trapped by the bushing 30 to reduce or eliminate undesirable vibration thereof at each of the joints 28.

Conventional means for fixedly joining the plug 32 against the frame 26 includes a fastener 40 in the exemplary form of a bolt and nut. The head of the fastener 40 is suitably recessed within the plug head 32b, with the fastener 40 extending through the plug bore 32a, and through an aperture 26a in the frame 26 for being fixedly joined thereto by the nut of the fastener 40.

In the exemplary embodiment illustrated in FIG. 2, the panel back and face sheets 24b and 24c are preferably conventional graphite-epoxy laminated sheets. Since conventionally used aluminum is incompatible with graphite and would lead to galvanic corrosion thereof, the bushing 30 is preferably formed of a suitable structural plastic such as nylon or Torion (Trademark) selected for preventing galvanic corrosion with the panel 24. The plug 32, and the unitary sleeve 36 and collar 38 may be separately conventionally molded for forming the bushing 30 in accordance with the present invention. A plastic bushing 30 will not corrode in the presence of graphite and may be made relatively inexpensively. However, the bonding ability of plastic and aluminum are different, and, in accordance with the present invention, the two-part plastic bushing 30 provides an improved bonded joint with the panel 24.

More specifically, the sleeve 36 has a predetermined length $L_2$ from the proximal end 36a to the distal end 36b selected for ensuring a suitable bond with the plug shank 32d. The sleeve 36 includes an annular inner surface 36c extending for the length $L_2$ of the sleeve 36 which is fixedly bonded to the outer surface of the plug shank 32d by a conventional epoxy adhesive 42 disposed therebetween. The length $L_2$ may be made as long as desired so that an adequate bond of correspondingly equal length $L_2$ due to the adhesive 42 fixedly traps the panel 24 between the plug head 32b and the collar 38. For example, the sleeve length $L_2$ may be as little as about one-third the thickness of the panel 24, or may extend completely to the plug head 32b for the entire thickness of the panel 24.

Since the sleeve 36 is bonded to the plug shank 32d in this exemplary embodiment by the adhesive 42, the collar 38 is preferably predeterminedly spaced from the frame 26 at a distance S greater than zero, and about 1.0 mm for example, to ensure that the collar 38 and sleeve 36 do not contact or vibrate directly against the frame 26 which would channel loads to the adhesive 42 and reduce the effective life thereof. The fastener 40 induces compressive loads in the plug shank 32 since the plug shank 32 abuts the frame 26 at the distal end 32c. By extending the plug shank 32d outwardly from the collar 38 for the distance S, the compressive loads are channeled solely through the plug shank 32d to the frame 26, without any component thereof being channeled through the sleeve 36 and the collar 38 to the frame 26. The sleeve 36 is therefore unloaded during operation by the fastener 40 compressive load, although the plug shank 32d is so loaded during operation, thusly ensuring maximum life of the adhesive 42 joining the sleeve 36 to the plug shank 32d. Of course, vibratory and aerodynamic loads during operation are channeled from the panel 24 through both the head 32b and sleeve 36 to the plug 32 and in turn to the frame 26. The bushing 30, therefore, reacts such loads along its longitudinal axis as well as transversely thereto.

Furthermore, by providing the two-part bushing 30, the integral sleeve 36 and collar 38 may be simply slid over the plug shank 32d during assembly, with the collar 38 simply abutting the panel back surface 24d. Conventional crimping or swaging of metallic conventional bushings for trapping the panel 24 is therefore not required or used in accordance with the invention, which therefore eliminates any crushing damage to the panel 24.

In order to more fully trap the panel 24 in the bushing 30, conventional epoxy adhesives 44 are also preferably disposed between the collar 38 and the panel back surface 24d, and between the plug head 32b and the panel face surface 24e for fixedly bonding together these members, respectively.

In the exemplary embodiment illustrated wherein the panel 24 is an acoustic panel in the fan duct 14, the panel face surface 24e faces radially inwardly and defines a portion of the fan duct 14. Since the flow area of the fan duct 14 must be maintained accurately for obtaining maximum aerodynamic efficiency of the fan duct 14, the length $L_1$ of the plugs 32 are predetermined for predeterminedly positioning the panel face surfaces 24e in the fan duct 14 for flow of the air 20 thereover. By trapping the panel 24 between the collar 38 and against the plug head 32b, the panel face surface 24e has a predetermined position relative to the plug 32. By predeterminedly selecting the length $L_1$ of the plug 32 relative to the frame 26, the plug 32 abuts the frame 26 when fastened thereagainst by the fastener 40 for providing a predetermined position of the panel face sheet 24e relative to the frame 26.

In order to ensure accurate positioning of the panel 24 between the collar 28 and the plug head 32b, the adhesive 44 used therebetween may be in the form of conventional supported epoxy films using a fiberglass scrim-cloth for maintaining a predetermined thickness of the adhesive 44, which may be for example about 0.1 mm.

Figure 3:
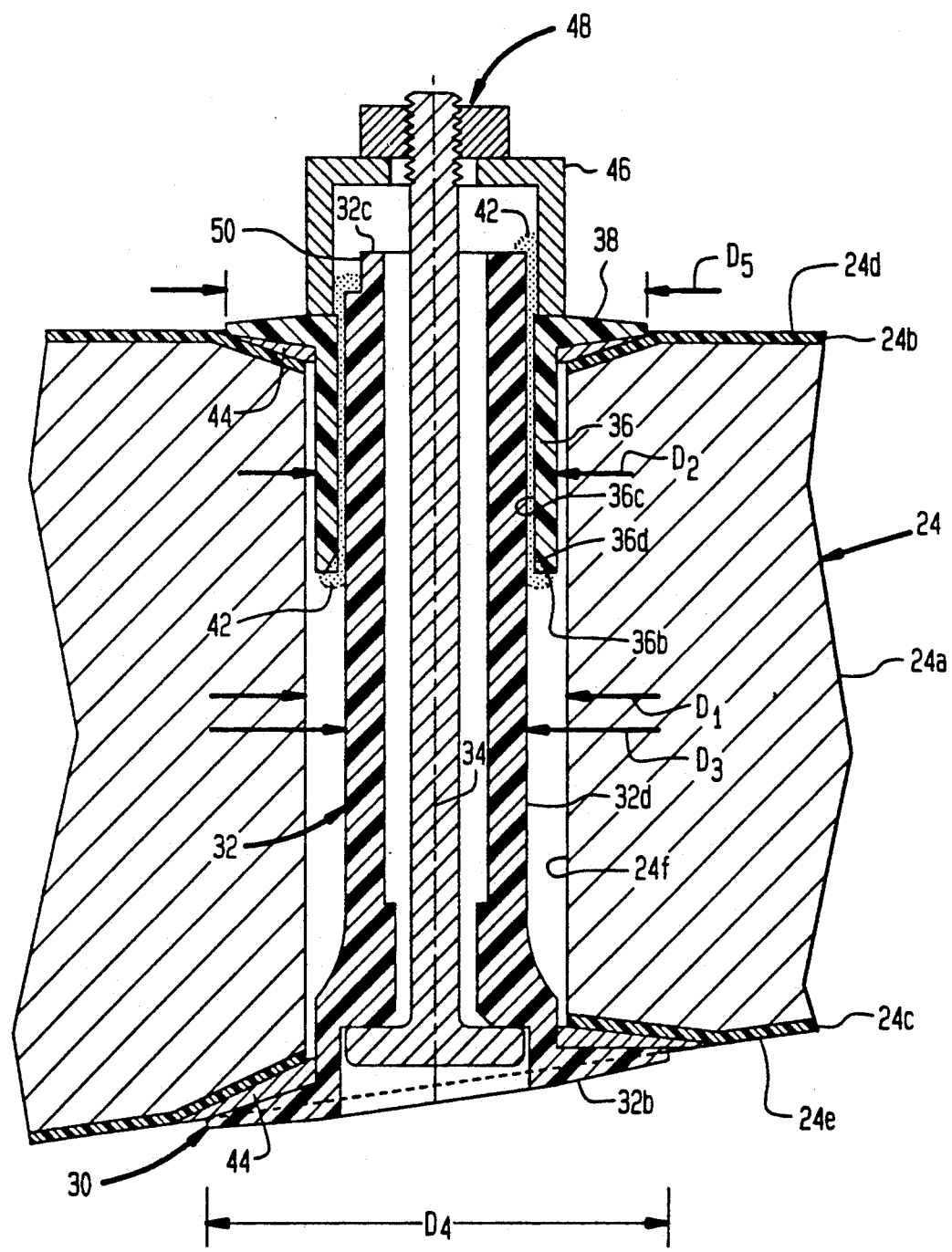
FIG. 3 is a longitudinal schematic view of a panel joint during assembly thereof.

The assembly process of the plug 32 to the sleeve 36 for trapping the panel 24 is shown schematically in FIG. 3. Since both the sleeve 36 and the plug 32 are joined together and positioned through the panel aperture 24f, the panel aperture 24f need not be a tapered aperture as found in conventional bonded bushings, but, instead, the panel aperture 24f is preferably cylindrical with the plug shank 32d and the sleeve 36 also being cylindrical. This allows for simpler manufacturing than that used with a tapered aperture in the panel 24. The epoxy adhesive 42 in the form of a paste is initially placed around the inner surface 36c of the sleeve 36. The sleeve 36 preferably includes an annular chamfer 36d disposed coaxially about the longitudinal axis 34 along the inner surface 36c at the sleeve distal end 36b. The paste adhesive 42 is also placed around the chamfer 36d so that when the plug 32 is inserted through the panel aperture 24f from the panel face surface 24e it is guided into the pre-inserted sleeve 36 by the chamfer 36d. And as the plug 32 is pushed through the sleeve 36, the chamfer 36d ensures that the adhesive 42 is distributed circumferentially around the plug shank 32d upon insertion thereof through the sleeve 36. Since the plug shank 32d and the sleeve 36 are cylindrical with a relatively tight radial clearance therebetween of about 0.1 mm, the plug distal end 32c will push a portion of the adhesive 42 out of the sleeve 36 as shown schematically in FIG. 3. However, the chamfer 36d will ensure improved spreading of the adhesive 42 over the entire extent of the sleeve inner surface 36c and the opposing outer surface of the plug shank 32d for ensuring a good bond joint therebetween.

The panel aperture 24f has an inner diameter $D_1$ which is suitably greater than the outer diameter $D_2$ of the sleeve 36, the difference therebetween being about 0.1 mm, for example. The outer diameter $D_3$ of the plug shank 32d is suitably smaller than the inner diameter of the sleeve 36 for providing a suitable radial clearance of about 0.1 mm, for example, for allowing the adhesive 42 to be distributed therein for forming an effective bond between the sleeve 36 and the plug shank 32d.

The adhesive 44 is preferably in the form of tubular rings and may be positioned over both ends of the panel aperture 24f prior to insertion of the plug 32 from one end and insertion of the sleeve 36 from the other end. The outer diameters $D_4$ and $D_5$ of the plug head 32b and the collar 38, respectively, and the respective rings of adhesive 44 are suitably larger than the inner diameter $D_1$ of the panel aperture 24f to ensure a suitable structural bond between the collar 38 and the panel back surface 24d and between the plug head 32b and the panel face surface 24e.

The sleeve 36 is preferably fixedly bonded to the plug shank 32d at a predetermined position for trapping the panel 24 between the plug head 32b and the collar 38 in compression for obtaining a tensile pre-load in the plug shank 32d after curing of the adhesives 42 and 44. In an exemplary embodiment, an annular spacer cup 46 is positioned against the collar 38 for receiving the plug distal end 32c therein, and a conventional fastener 48, for example a bolt and nut, is used to selectively clamp in compression the panel 24 between the collar 38 and the plug head 38b. By selectively tightening the nut of the fastener 48 against the cup 46, the bolt of the fastener 48 is placed in tension and the cup 46 compresses the collar 38 against the panel back surface 24d and further inserts the sleeve 36 into the panel aperture 24f. The adhesives 42 and 44 are then allowed to be conventionally cured, after which the fastener 48 and the cup 46 are removed, with the compression load on the panel 24 being reacted by tension loads in the plug shank 32d. The resulting bushing 30 is, therefore, securely bonded to the panel 24 with a predetermined tensile pre-load in the plug shank 32d between the collar 38 and the plug head 32b for ensuring a tight joint with the panel 24. This procedure is repeated for each of the bushings 30 in the panel 24, and then the panel 24 is assembled to the frame 26 as shown in FIG. 2 and secured thereto by the fasteners 40.

Figure 4:
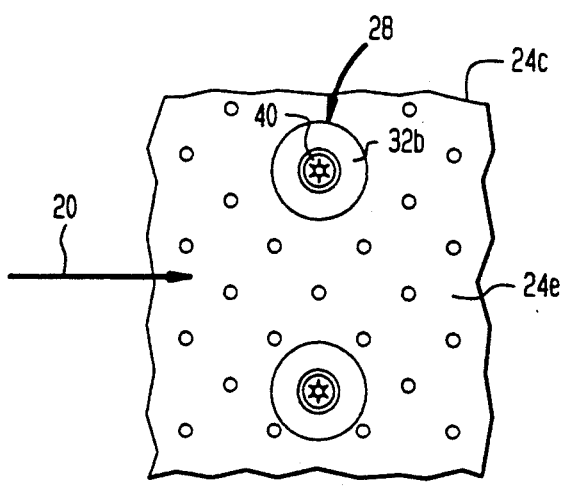
FIG. 4 is a plan view of two circumferentially adjacent panel joints of the panel illustrated in FIG. 2 facing radially outwardly along line 4—4.

As shown in FIG. 2, the panel face sheet 24c is inclined at an acute angle A relative to the longitudinal axis 34 of the plug 32, although in alternate embodiments of the invention, it may be disposed normal thereto with the angle A being equal to 90°. In order to provide a low profile plug head 32b within the fan duct 14, the plug head 32b is preferably similarly inclined or canted at the acute angle A and aligned parallel to the inclined panel face sheet 24c. This ensures that the plug head 32b provides minimal disturbance of the flow of air 20 within the fan duct 14 as well as provides a uniform gap around the plug head 32b and the panel face surface 24e for receiving the adhesive 44. As shown in FIG. 2, and in FIG. 4, the plug heads 32b provide a substantially smooth and continuous surface with the panel face surface 24e. Since the bushing 30 is plastic in the preferred embodiment, its canted head 32b may be easily formed by conventional injection molding.

Figure 5:
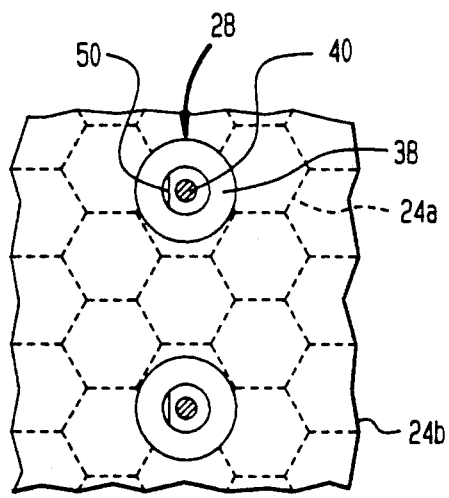
FIG. 5 is a plan view of two circumferentially adjacent joints of the panel illustrated in FIG. 2 facing radially inwardly along line 5—5.

Since the plug head 32b is canted, it must be suitably assembled to the panel 24 so that it is aligned parallel to the inclined panel face sheet 24c. Accordingly, the plug distal end 32c includes an indexing, or clocking, flat or recess 50 as shown in FIGS. 3 and 5 which is predeterminedly oriented relative to the canted plug head 32b, for example on the upstream side thereof and oriented in the circumferential direction. Accordingly, upon assembly of the plugs 32 through the panel apertures 24f the canted plug heads 32b may be properly positioned by aligning the clocking flats 50.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention. For example, the bushing 30 could, alternatively, be formed of metal such as aluminum, and with a suitable galvanic barrier between the bushing 30 and the panel 24. Furthermore, although the panel 24 is an acoustic panel in the preferred embodiment, it may, alternatively, be a flow panel to confine airflow.

Accordingly, what is desired to be secured by Letters Patent of the United States is the invention as defined and differentiated in the following claims:

1. A joint comprising:
   a stationary frame;
   a panel disposed adjacent to said frame, and including spaced apart back and face surfaces and an aperture therethrough;
   a bushing including:
      a tubular plug extending through said panel aperture and having a head abutting said panel face surface, a distal end extending outwardly from said panel back surface and abutting said frame, and a shank therebetween;

a tubular sleeve extending into said panel aperture, and disposed around and fixedly bonded to said plug shank; and a collar formed integrally with said sleeve and fixedly bonded to said panel back surface for fixedly trapping said panel between said collar and said plug head, said collar being spaced from said frame; and a fastener extending through said plug and fixedly joining said plug against said frame.

2. A panel joint according to claim 1 wherein said sleeve has a length, and includes an annular inner surface fixedly bonded to said plug shank by an adhesive therebetween to fixedly trap said panel between said plug head and said collar.

3. A panel joint according to claim 2 wherein said sleeve includes a chamfer at a distal end thereof for distributing adhesive circumferentially around said plug upon insertion of said plug through said sleeve during assembly.

4. A panel joint according to claim 2 wherein said plug head is fixedly bonded to said panel face surface by an adhesive therebetween.

5. A panel joint according to claim 2 wherein said sleeve is fixedly bonded to said plug shank at a predetermined position for trapping said panel between said plug head and said collar in compression for obtaining a tensile pre-load in said plug shank.

6. A panel joint according to claim 2 wherein said panel is an annular panel in a gas turbine engine fan nacelle, and said panel face surface faces radially inwardly, and said plug has a predetermined length from said head to said distal end for predeterminedly positioning said panel face surface for flow of air thereover.

7. A panel joint according to claim 6 wherein said panel includes spaced apart, graphite-epoxy laminated face and back sheets defining said face and back surfaces, respectively, and said plug and bushing are plastic selected for preventing galvanic corrosion with said panel.

8. A panel joint according to claim 7 wherein said panel face sheet is inclined at an acute angle relative to a longitudinal axis of said plug, and said plug head is canted at said acute angle and aligned parallel to said inclined panel face surface.

9. A panel joint according to claim 8 wherein said plug distal end includes a clocking flat predeterminedly oriented relative to said canted plug head for aligning said plug head parallel to said inclined panel face surface.

10. A panel joint according to claim 9 wherein said panel aperture is cylindrical, and said sleeve is cylindrical.

11. A panel joint according to claim 10 wherein said plug head is fixedly bonded to said panel face surface by an adhesive therebetween.

12. A panel joint according to claim 11 wherein said sleeve is fixedly bonded to said plug shank at a predetermined position for trapping said panel between said plug head and said collar in compression for obtaining a tensile pre-load in said plug shank.

13. A panel joint according to claim 12 wherein said panel is an acoustic panel.

* * * * *